United States Patent [19]

Wigle et al.

[11] Patent Number: 5,632,911

[45] Date of Patent: May 27, 1997

[54] APPARATUS FOR AIDING IN THE MANIPULATION OF A TOOL

[75] Inventors: Robert L. Wigle, Lasalle; Edward J. Grondin, Tecumseh, both of Canada

[73] Assignee: Doben Limited, Windsor, Canada

[21] Appl. No.: 406,166

[22] Filed: Mar. 17, 1995

[51] Int. Cl.$^6$ ............................ B23K 11/11; B23K 37/02; F16C 11/02; F16C 11/06

[52] U.S. Cl. ..................... 219/89; 219/86.25; 219/86.31; 219/90; 403/54

[58] Field of Search .............................. 219/69.15, 69.2, 219/86.25, 86.31, 89, 90; 248/278.1; 403/53, 54, 58

[56] References Cited

U.S. PATENT DOCUMENTS

| | | | |
|---|---|---|---|
| 2,318,023 | 5/1943 | Strickland | 219/89 |
| 2,318,024 | 5/1943 | Strickland | 219/89 |
| 2,358,155 | 9/1944 | Frederick | 219/89 |
| 2,369,294 | 2/1945 | Harris | 219/89 |
| 4,024,370 | 5/1977 | Sciaky | 219/90 |

FOREIGN PATENT DOCUMENTS 57-91885  6/1982  Japan.

*Primary Examiner*—Geoffrey S. Evans
*Assistant Examiner*—J. Pelham
*Attorney, Agent, or Firm*—Allen D. Gutchess, Jr.

[57] ABSTRACT

Apparatus for aiding in the manipulation of a tool by supporting the weight thereof is designed particularly for a resistance welding tool. The apparatus includes an overhead support, a curved bar hanging below the support, a trunnion connected to a lower end of the curved bar and a generally horizontal arm rotatably held by and extending out from the trunnion. In particular, the apparatus includes a bail having a circular frame affixed to an outer end of the generally horizontal arm. The bail has two plates affixed together and rotatably carried by the circular frame. The plates have central openings therein to receive the tool and have holes spaced around the central openings to receive fluid fittings to aid in operating the tool. The plates can have manifolds therein to reduce the number of lines required to operate the tool.

13 Claims, 3 Drawing Sheets

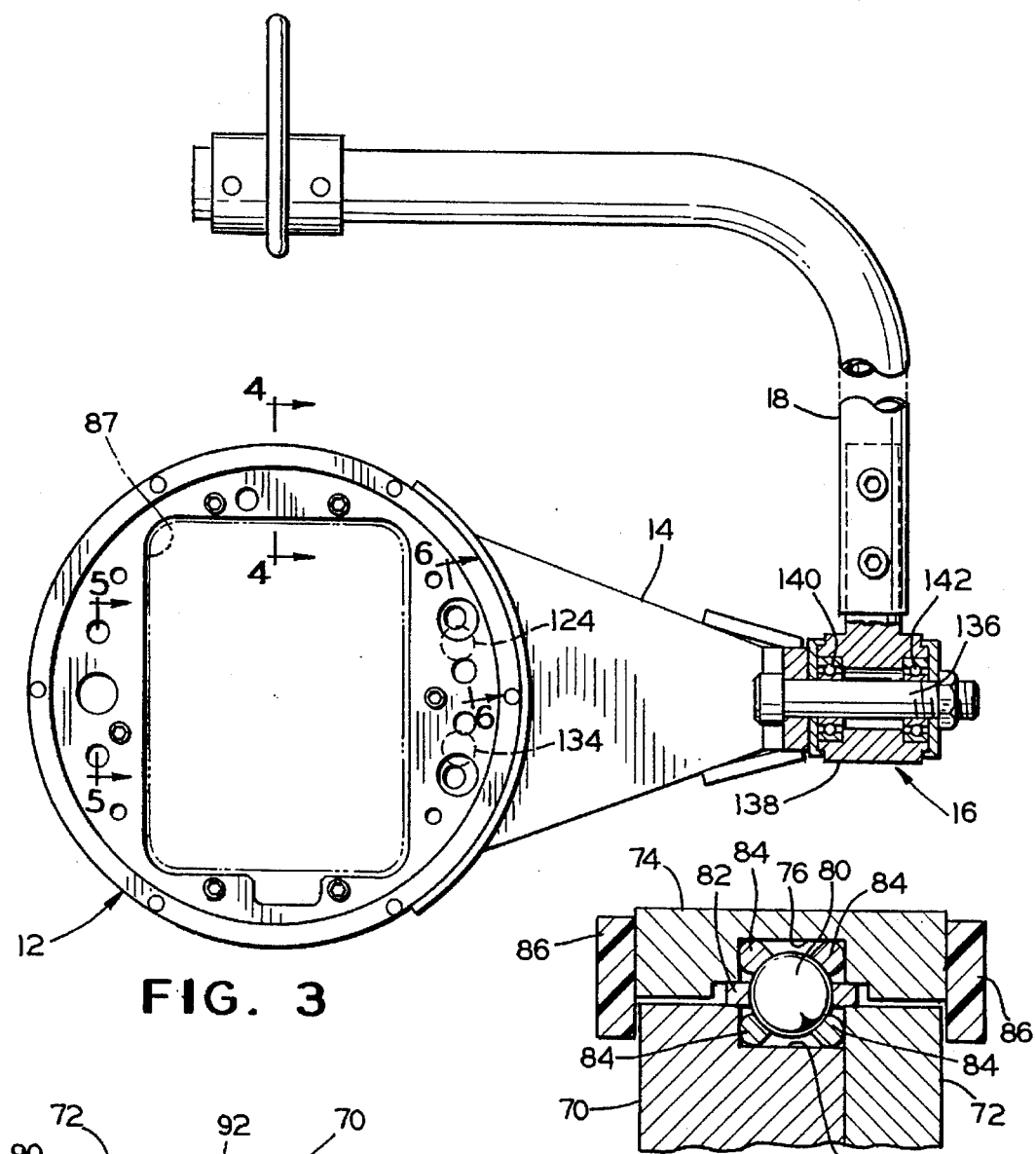
FIG. 3
FIG. 4
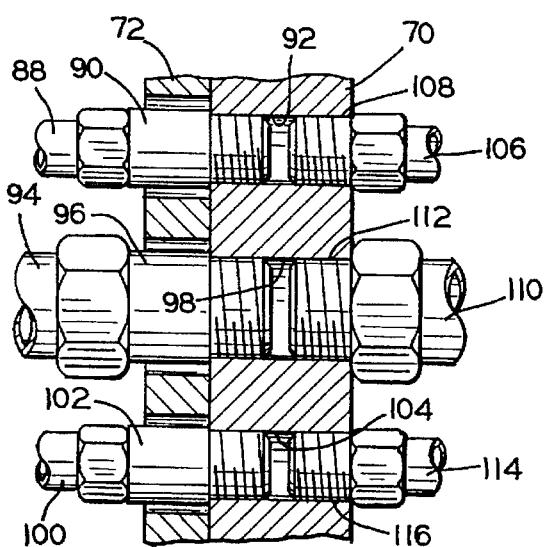
FIG. 5
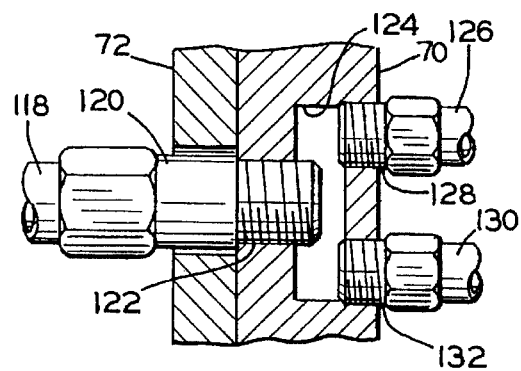
FIG. 6

5,632,911

APPARATUS FOR AIDING IN THE MANIPULATION OF A TOOL

This invention relates to apparatus for aiding in the manipulation of a tool.

The apparatus is designed particularly for resistance welding tools, but can be designed for other tools which are manipulated by hand. The apparatus includes a bail consisting of two plates which are rotatably held in a circular frame. The plates have central openings shaped to fit the body of the particular tool. The plates also have holes around the opening to receive fittings for all tool services such as water, hydraulic fluid, and compressed air. When the tool and plates are turned in the frame, the fittings also rotate to keep the lines supplying them in the same positions clear of the tool. Manifolds can also be built into the plates to reduce the number of supply lines.

The frame of the bail can be affixed to a generally horizontal arm which is rotatably mounted in a trunnion. The trunnion can be located at the lower end of a curved bar which is suspended from an overhead rail or the like. The bail enables the tool to be rotated 360° in a vertical plane and the trunnion enables the tool and bail to be tilted on a horizontal axis.

It is, therefore, a principal object of the invention to provide apparatus for aiding in the manipulation of a tool having the advantages set forth above.

Many other objects and advantages of the invention will be apparent from the following detailed description of a preferred embodiment thereof, reference being made to the accompanying drawings, in which:

FIG. 3 is a back view in elevation of the bail, a trunnion, and a curved supporting bar, with parts broken away and with parts in section;

FIG. 4 is an enlarged, fragmentary view in section of a circular frame and front and back plates of the bail;

FIG. 5 is an enlarged, somewhat schematic, fragmentary view in section taken along the line 5—5 of FIG. 3; and FIG. 6 is an enlarged, somewhat schematic, fragmentary view in section taken along the line 6—6 of FIG. 3.

Figure 1:
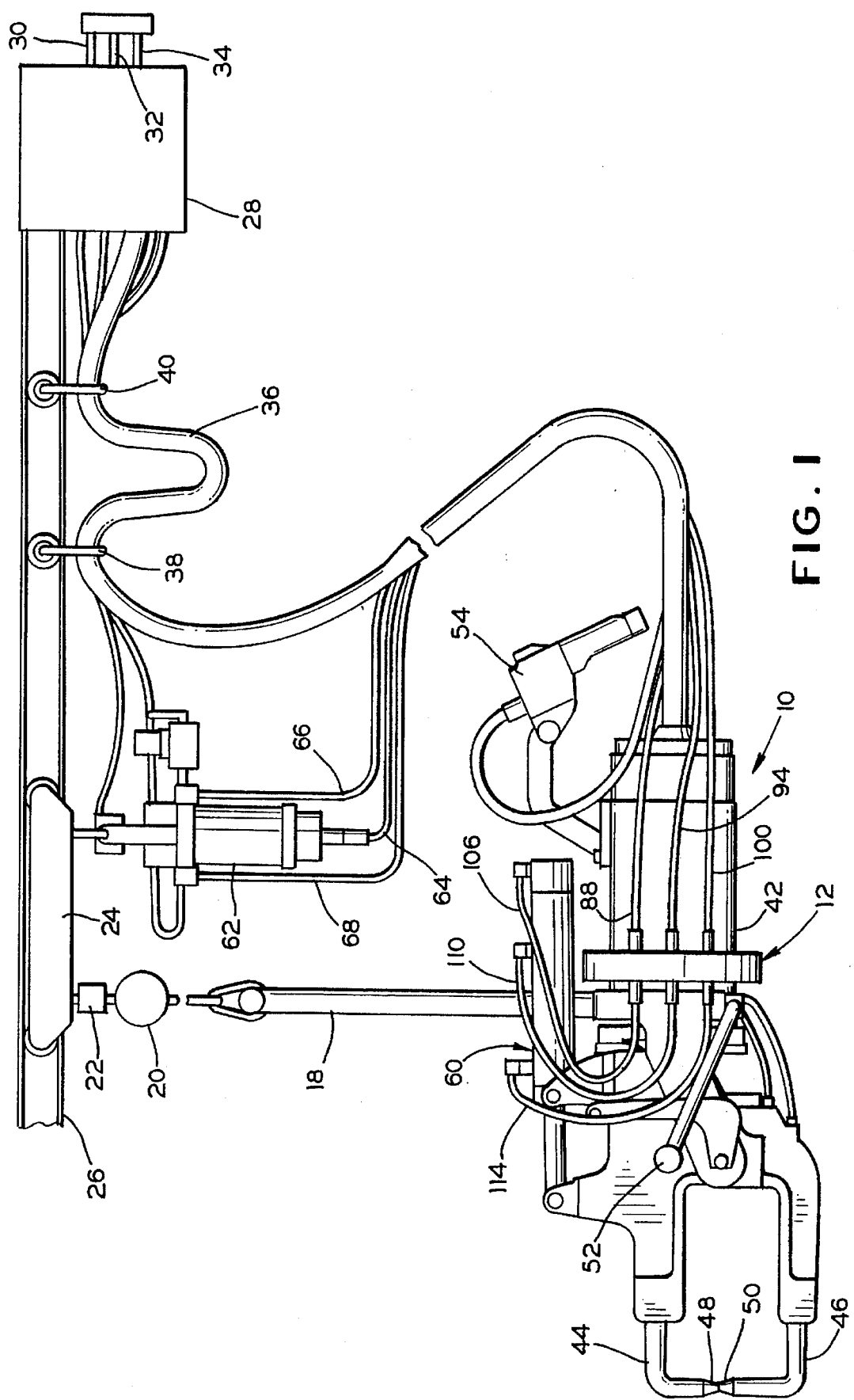
FIG. 1 is a somewhat schematic overall view in elevation showing apparatus for operating and manipulating a resistance welding tool.

Referring to the drawings, and particularly FIG. 1, a tool indicated at 10 is mounted in a bail 12 which is supported by an arm 14 (FIG. 3). The arm 14 is affixed to a trunnion 16 located at the lower end of a curved bar 18. Referring again to FIG. 1, the curved bar 18 is suspended below an air or spring balancer 20 which is connected to a lateral rail 22. The rail 22 is connected to a truck frame 24 which is mounted on a running rail 26.

The tool 10 is shown as a resistance welding stool and, specifically, a commercially-available transgun welding tool. It is similar to those shown in Beneteau U.S. Pat. Nos. 4,525,618, and 4,504,725, and will not be discussed in detail.

A welding control 28 is located at an end of the running rail 26. To the right of the welding control 28 is a compressed air supply line 30, a water supply line 32, and a water return line 34. The unnumbered lines to the left of the welding control 28 include a cooling water supply line, a cooling water return line, a compressed air supply line, a power cable, a control cable, and a firing handle cable. These are bundled with a shielded power cable 36. The cable 36 is supported by overhead trolleys 38 and 40 from the running rail 26.

Figure 2:
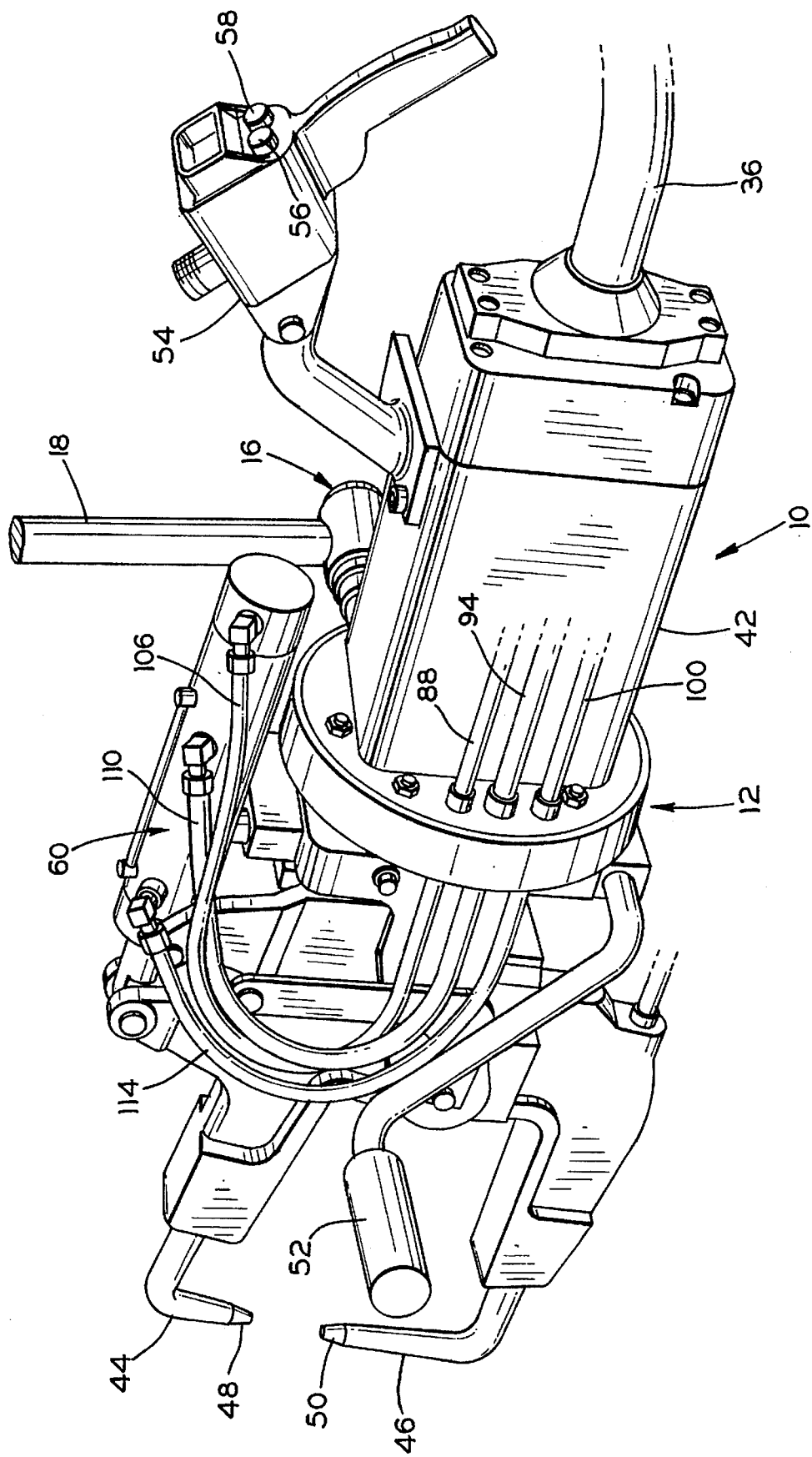
FIG. 2 is an enlarged view in perspective showing the welding tool and a bail of FIG. 1.

Referring to FIG. 2 in particular, the transgun resistance welding tool 10 basically includes a transformer 42, electrode holders 44 and 46, and electrodes 48 and 50. A manipulation handle 52 is located on the front left or right side of the tool. 10 and a firing handle 54 is mounted on the rear of the tool 10. The firing handle 54 has a control button 56 to control the firing of the electrodes and a button 58 which controls the distance the electrodes are apart when in their spaced positions However, there can be more than two of the buttons to provide maximum flexibility in using all weld control features.

The movement of the electrodes is determined by a pressure intensifier cylinder 60 which can be of the type shown in Beneteau U.S. Pat. Nos. 4,099,436 and 4,135,076. Therefore, it will not be discussed in detail. Also, other welding tools not using the cylinder 60 can be employed.

The pressure intensifier cylinder 60 is connected with a reservoir 62 suspended from the truck frame 24. The cylinder 60 is connected with the reservoir 62 through a hydraulic fluid line 64, a pressure air line 66, and a cylinder return air line 68.

The welding tool has the power and firing handle cables which are located at the rear of the welding tool. However, the forward portion of the welding tool also requires a pressure air line, a return air line, and a hydraulic fluid line for the cylinder 60 as well as cooling water supply and return lines for the transformer and the electrode holders. Heretofore, these lines simply were directly connected to the tool and could become entangled during its manipulation. However, with the bail 12, the lines are connected out of the way of the tool and remain out of the way when the tool is manipulated during welding operations.

Referring more particularly to FIGS. 3–6, the bail 12 includes an aluminum front plate 70 and an aluminum back plate 72 which are suitably affixed together. These are rotatably mounted in a steel circular frame 74 having an annular inner recess 76 which is opposite a recess 78 in the front plate 70. Rotation of the plates 70 and 72 is achieved by ball bearings 80, a bearing cage 82, and wire rings 84. Plastic dust guards 86 are affixed to the circular frame 74 by suitable fasteners to keep out contaminants. The front and back plates 70 and 72 have suitable large openings 87 centrally located therein and shaped to fit a particular tool being used.

On the left side of the tool 10, as viewed in FIG. 2, and shown in FIG. 5, is an upper line 88 and a fitting 90 which is threaded into a threaded bore 92 in the front plate 70. The line 88 carries pressurized air for the pressure intensifier cylinder 60. Below the line 88 is a line or hose 94 with a fitting 96 threaded into a threaded bore 98. The line 94 carries hydraulic fluid for the pressure intensifier cylinder. Below the line 94 is a line 100 with a fitting 102 which is threaded into a threaded bore 104 in the front plate 70. The line carries return air for the pressure intensifier cylinder 60.

The line 88 communicates with a line 106 with a fitting 108, the line 106 extending in front of the bail 12 to the pressure intensifier cylinder. Similarly, the line 94 communicates with a line or hose 110 having a fitting 112 connected to the pressure intensifier cylinder. Similarly, the line 100 communicates with a line 114 having a fitting 116 connected to the pressure intensifier cylinder 60 to operate the cylinder in accordance with the aforesaid patents.

Referring to FIGS. 3 and 6, on the right side of the tool 10, as viewed from the rear, is a cooling water line 118 having a fitting 120 threaded into a threaded bore 122 in the front plate 70. A similar line and fitting are located below the line 118 also intended for cooling water. Either of these can supply cooling water and the other is a return cooling water line. The line 118 communicates with a recess or manifold 124 formed in the front plate 70.

A forward line 126 with a fitting 128 communicates with the manifold 124 and supplies water to or returns it from the transformer of the welding tool. A lower line 130 with a fitting 132 communicates with the manifold 124 and supplies cooling ware to or returns water from the electrode holders. A lower recess or manifold 134, indicated in dotted lines in FIG. 3, similarly is connected to a cooling water line similar to the line 118 which, through the manifold 134, supplies or returns water through lines ismilar to the lines 126 and 130. Of course, the manifolds 124 and 134 may also have three or more branch circuits, as space and tool requirements dictate.

The lines 88, 94, and 100 communicate through the cable bundle 36 with the lines 66, 64, and 68 (FIG. 1), respectively. The cooling water supply and return lines are connected to the corresponding lines, through the cable bundle, which are shown to the left of the welding control 28.

With the bail 12, it will be seen that the lines are kept separated and close to the tool, enabling the operator to have greater visibility of the electrodes. The manifold arrangement in the bail plate also reduces the number of supply lines required for the cooling water, in this instance. The manifolds can also minimize the number of pneumatic or hydraulic lines in addition to the water lines.

The trunnion 16 includes a shaft 136 which is affixed to the arm 14 via a plate with slotted adjustment holes (not shown) and extends through a housing 138 where it is rotatably held by bearings 140 and 142. The plate with the slotted adjustment holes permits balancing of the tool after final installation to achieve ergonomic efficiency for the operator.

Various modification of the above-described embodiment of the invention will be apparent to those skilled in the art, and it is to be understood that such modifications can be made without departing from the scope of the invention, if they are within the spirit and the tenor of the accompanying claims.

We claim:

1. Apparatus for aiding in the manipulation of a tool by supporting the weight thereof, said apparatus comprising an overhead support, a curved bar hanging below said overhead support, a trunnion connected to a lower end of said curved bar, a generally horizontal arm rotatably held by and extending out from said trunnion, a bail having a circular frame affixed to an outer end of said generally horizontal arm, a disc-shaped front plate and a disc-shaped back plate, means affixing said disc-shaped front plate and said disc-shaped back plate together in parallel relationship, said disc-shaped front plate and said disc-shaped back plate being rotatably carried by said circular frame in a central plane defined by said circular frame, said disc-shaped front and back plates having coincident central openings to receive the tool, rand said disc-shaped front and back plates having holes spaced around the openings to receive fittings to aid in operating the tool.

2. Apparatus according to claim 1 wherein said tool is a resistance welding tool.

3. Apparatus according to claim 2 wherein a pressure intensifier cylinder is mounted on said resistance welding tool for operating electrode holders of said tool.

4. Apparatus according to claim 2 wherein said front plate has a recessed manifold therein, two cooling water lines communicating with said recessed manifold and with a transformer of said tool and the electrode holders of said tool, and a supply line for cooling water communicating with said manifold and extending rearwardly from said bail.

5. Apparatus according to claim 4 wherein said disc-shaped front plate has a second recessed manifold, two lines communicating with said second manifold and with the transformer and the electrode holders, and a return cooling water line communicating with said second recessed manifold and extending rearwardly from said bail.

6. Apparatus according to claim 3 wherein said disc-shaped front plate has three threaded bores therein to receive fittings, fittings in said bores, and lines connected to said fittings to supply air under pressure, return air, and hydraulic fluid to said pressure intensifier cylinder.

7. Apparatus for aiding in the manipulation of a tool having a pressure intensifier cylinder for operating the tool, said apparatus comprising a bail having a circular frame, a disc-shaped front plate and a disc-shaped back plate, means affixing said disc-shaped front plate and said disc-shaped back plate together in parallel relationship, said disc-shaped front plate and said disc-shaped back plate being rotatably carried by said circular frame in a central plane defined by said circular frame, said disc-shaped front and back plates having coincident central openings to receive the tool, and said disc-shaped front and back plates having holes spaced outwardly from the openings to receive fittings and lines to aid in operating the tool and the pressure intensifier cylinder, said lines comprising a line for supplying air under pressure to said pressure intensifier cylinder, a line for supplying return air to said pressure intensifier cylinder, and a hydraulic fluid line for supplying hydraulic fluid to said pressure intensifier cylinder.

8. Apparatus according to claim 7 wherein said tool is a resistance welding tool and said disc-shaped front and back plates having additional holes spaced away from the central openings to receive fittings for lines to supply cooling water to a transformer and electrode holders of the resistance welding tool.

9. Apparatus according to claim 8 wherein said bail has a manifold therein to supply cooling water to the transformer and electrode holders from a single supply line, and another manifold therein to return cooling water from the transformer and electrode holders through a single return line.

10. Apparatus for aiding in the manipulation of a resistance welding tool having a pressure intensifier cylinder for moving electrode holders of the tool, said apparatus comprising a bail having a circular frame and disc-shaped plate means rotatably carried by said circular frame in a central plane defined by said circular frame, said disc-shaped plate means having a central opening to receive the resistance welding tool, said disc-shaped plate means having holes spaced outwardly from the central opening to receive fittings and lines to aid in operating the resistance welding tool and the pressure intensifier cylinder, an arm affixed to said circular frame, and a trunnion connected to said arm to enable said arm and said bail to rotate about a generally horizontal axis, said disc-shaped plate means having a manifold therein for connecting two lines at the front of the bail facing toward the electrode holders and one line toward the back of the bail facing away from the electrode holders.

11. Apparatus according to claim 10 wherein said lines supply cooling water to said electrode holders and to a transformer of the resistance welding tool.

12. Apparatus according to claim 10 wherein said plate means has an additional manifold therein for connecting two lines at the front of the bail facing toward the electrode holders and one line toward the back of the bail facing away from the electrode holders.

13. Apparatus according to claim 12 wherein said lines connected to the additional manifold supply return water from the electrode holders and the transformer.

\* \* \* \* \*

UNITED STATES PATENT AND TRADEMARK OFFICE
CERTIFICATE OF CORRECTION

PATENT NO. : 5,632,911
DATED : May 27, 1997
INVENTOR(S) : Robert L. Wigle and Edward J. Grondin It is certified that error appears in the above-identified patent and that said Letters Patent is hereby corrected as shown below:

Column 1, line 53, change "stool" to --tool--.

Column 2, line 5, change "tool." to --tool--.

Column 2, line 9, change "positions However," to --positions. However,--.

Column 3, line 8, change "ware" to --water--.

Column 3, line 52, Claim 1, line 14, change "rand" to --and--.

Column 4, line 13, Claim 7, line 3, change "ball" to --bail--.

Column 4, line 50, Claim 10, line 13, change "ball" to --bail--.

Signed and Sealed this

Twenty-seventh Day of January, 1998

Attest:

Attesting Officer

BRUCE LEHMAN

Commissioner of Patents and Trademarks